US011538059B2

(12) United States Patent
Enokida et al.

(10) Patent No.: US 11,538,059 B2
(45) Date of Patent: Dec. 27, 2022

(54) NON-TRANSITORY COMPUTER READABLE STORAGE MEDIUM, ALLOCATION APPARATUS, AND ALLOCATION METHOD

(71) Applicant: Yahoo Japan Corporation, Tokyo (JP)

(72) Inventors: Sojo Enokida, Tokyo (JP); Yohei Abe, Tokyo (JP); Asuka Aihara, Tokyo (JP)

(73) Assignee: Yahoo Japan Corporation, Tokyo (JP)

( * ) Notice: Subject to any disclaimer, the term of this patent is extended or adjusted under 35 U.S.C. 154(b) by 0 days.

(21) Appl. No.: 17/197,303

(22) Filed: Mar. 10, 2021

(65) Prior Publication Data

US 2021/0406949 A1 Dec. 30, 2021

(30) Foreign Application Priority Data

May 8, 2020 (JP) .............................. JP2020-082867

(51) Int. Cl.
*G06Q 30/02* (2012.01)
*G06F 16/957* (2019.01)

(52) U.S. Cl.
CPC ..... *G06Q 30/0242* (2013.01); *G06F 16/9577* (2019.01); *G06Q 30/0277* (2013.01); *G06Q 30/0272* (2013.01)

(58) Field of Classification Search
CPC ........... G06Q 30/0242; G06Q 30/0277; G06Q 30/0272; G06F 16/9577
See application file for complete search history.

(56) References Cited

U.S. PATENT DOCUMENTS

| 5,014,331 | A  | * | 5/1991 | Kurogane | G06T 11/40 |
|---|---|---|---|---|---|
| | | | | | 382/199 |
| 8,867,107 | B1 | * | 10/2014 | Shimizu | H04N 1/02895 |
| | | | | | 358/475 |
| 10,783,548 | B1 | * | 9/2020 | Bhowmick | G06Q 30/0242 |
| 11,100,529 | B1 | * | 8/2021 | Tsemekhman | G06Q 30/0272 |
| 2004/0261279 | A1 | * | 12/2004 | Conner | G01B 3/08 |
| | | | | | 33/485 |

(Continued)

FOREIGN PATENT DOCUMENTS

JP 2011180730 A * 9/2011
JP 2014-219740 A 11/2014

(Continued)

OTHER PUBLICATIONS

Marta Exposito-Ventura, Analyzing and Testing Viewability Methods in an Advertising Network, Jan. 1, 2020, IEEE, vol. 8, pp. 118751-118761.*

(Continued)

*Primary Examiner* — Arthur Duran
(74) *Attorney, Agent, or Firm* — Procopio, Cory, Hargreaves & Savitch LLP

(57) ABSTRACT

A non-transitory computer readable storage medium having an arrangement program according to the present application thereon causes a computer to execute an acquiring process and an arranging process. The acquiring process acquires browsing mode information that indicates a mode of browsing content. The arranging process arranges, in a mode based on the browsing mode information acquired at the acquiring process, at least one element that is used to judge whether the content has actually been browsed by a user in a content area in which the content is provided.

8 Claims, 7 Drawing Sheets

(56) References Cited

U.S. PATENT DOCUMENTS

| | | | | |
|---|---|---|---|---|
| 2009/0326966 A1* | 12/2009 | Callaghan | .......... | G06Q 30/0247 |
| | | | | 705/14.69 |
| 2013/0162534 A1* | 6/2013 | Chen | .................... | G06F 3/0346 |
| | | | | 345/158 |
| 2014/0130341 A1* | 5/2014 | Hung | ................ | H05K 13/0812 |
| | | | | 29/739 |
| 2015/0154282 A1* | 6/2015 | Watanabe | ........... | G06F 16/2264 |
| | | | | 707/743 |
| 2017/0103430 A1* | 4/2017 | Gilbert | ............... | G06Q 30/0277 |
| 2017/0372380 A1* | 12/2017 | Candiotti | ........... | G06Q 30/0277 |

FOREIGN PATENT DOCUMENTS

| | | | |
|---|---|---|---|
| JP | 2019-021107 A | 2/2019 | |
| WO | 2015063909 A1 | 5/2015 | |
| WO | WO-2015063909 A1 * | 5/2015 | ............. G06F 13/00 |

OTHER PUBLICATIONS

Zhang, An Empirical Study on Display Ad Impression Viewability Measurements, May 21, 2015, ARKXIV.*

Japanese Patent Office, Notice of Reasons for Refusal, Application No. JP 2020-082867, dated Jun. 22, 2022, in 8 pages.

* cited by examiner

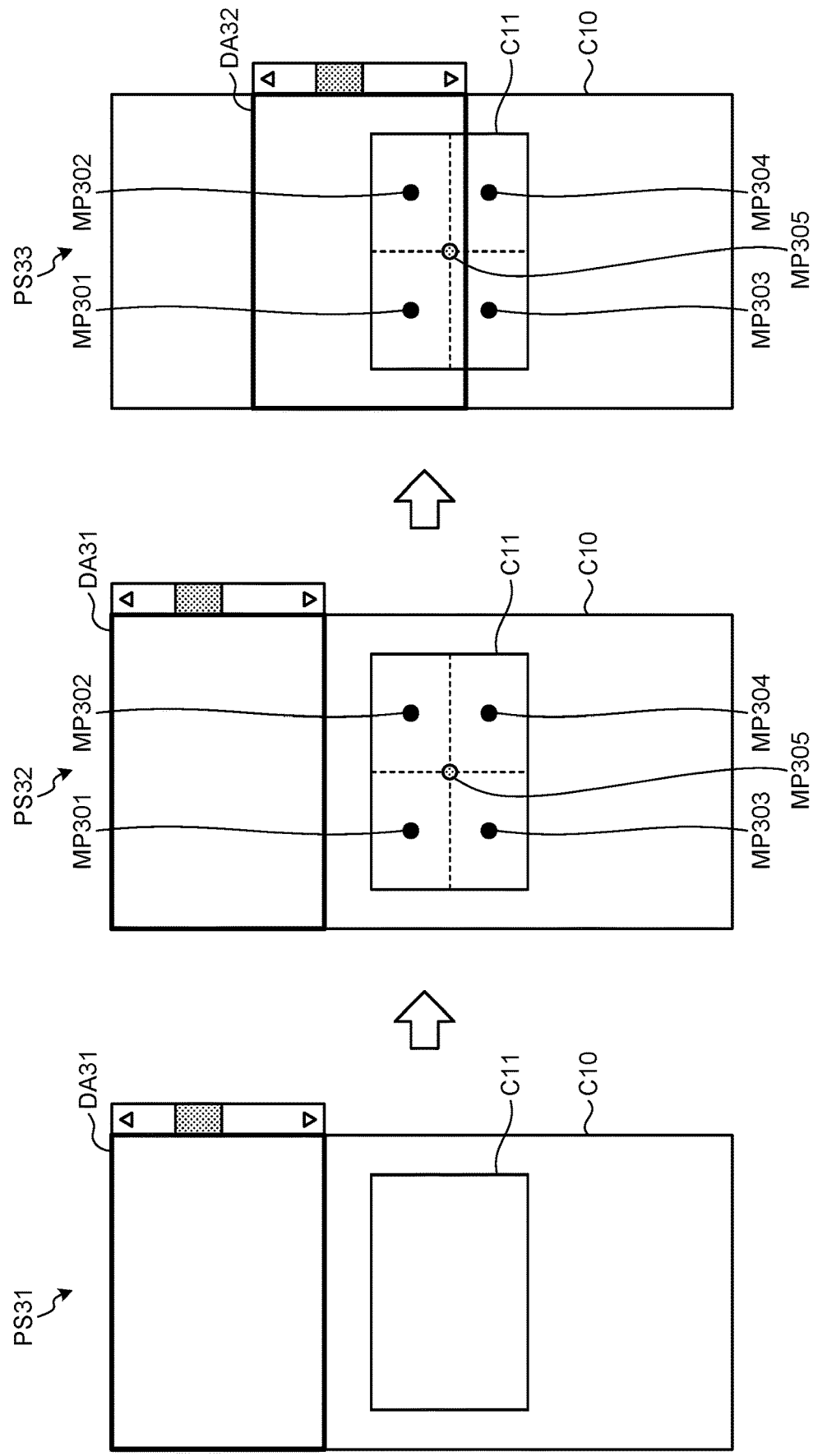

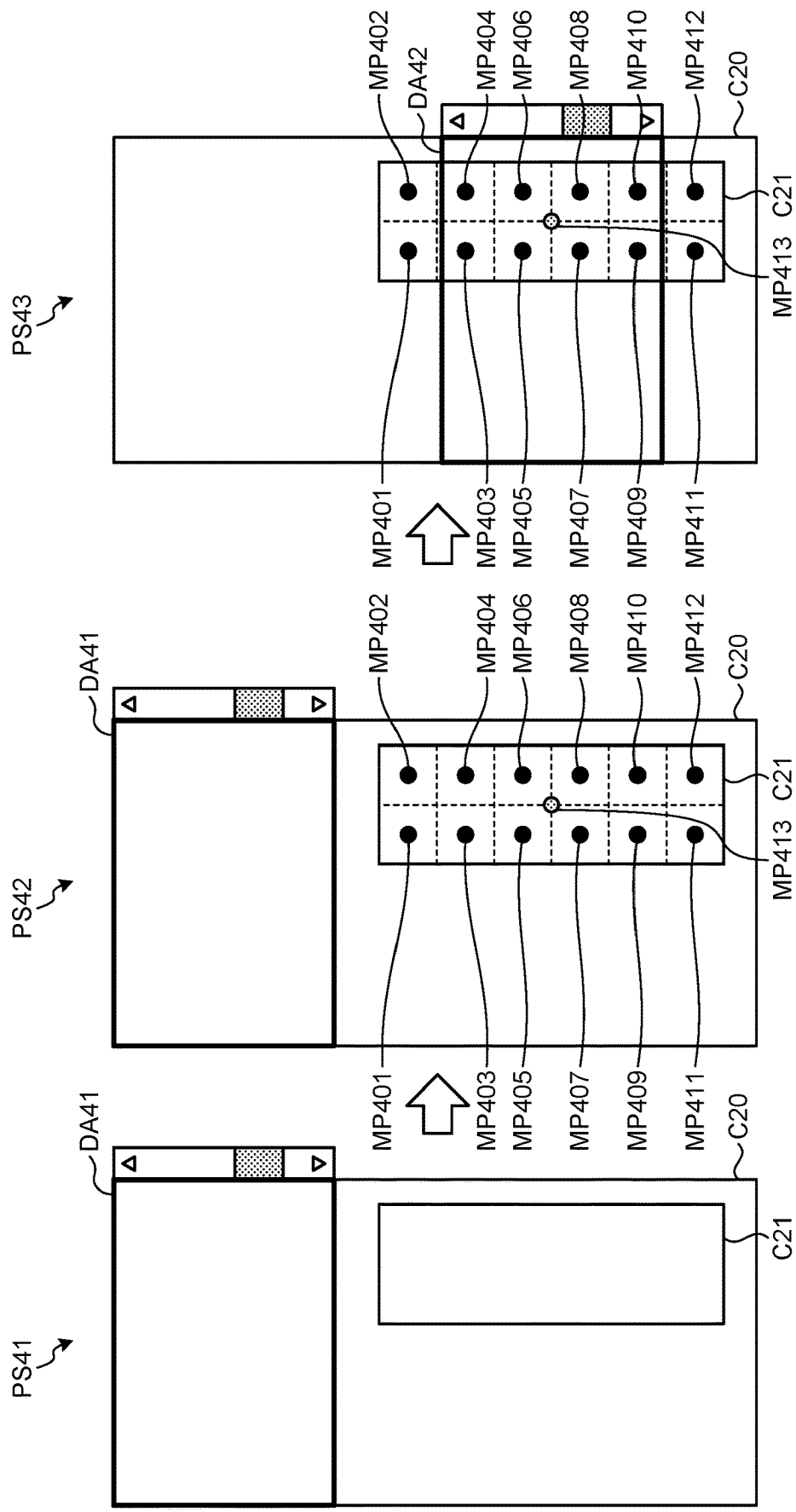

NON-TRANSITORY COMPUTER READABLE STORAGE MEDIUM, ALLOCATION APPARATUS, AND ALLOCATION METHOD

CROSS-REFERENCE TO RELATED APPLICATION(S)

The present application claims priority to and incorporates by reference the entire contents of Japanese Patent Application No. 2020-082867 filed in Japan on May 8, 2020.

BACKGROUND OF THE INVENTION

1. Field of the Invention

The present invention relates to an arrangement program, an arrangement device, and an arrangement method.

2. Description of the Related Art

Advertisers are able to display own advertisements in ad spots in online content, such as content in a web page or in an application (hereinafter, referred to as an "app"). An advertiser sometimes desires to know not only an impression of the advertisement content (i.e., whether the advertisement content has been delivered to an ad spot) but also the number of times the advertisement content has actually been viewed. In order to analyze a visibility status of the advertisement content, various visibility measurement technologies are proposed.

In one of the technologies, whether or not a video advertisement is displayed on a browser in a visible manner is judged (International Publication Pamphlet No. WO2015/063909). In this technology, a transparent video is displayed as a beacon for judging the visibility of the video advertisement onto top of the video advertisement. If the beacon is present in an invisible area, a video player is able to reduce the frame rate of the beacon in order to decrease the load applied to a processor. The visibility of the video advertisement is judged by using a change in frame rate of the beacon between a visible area and an invisible area.

However, in the conventional technology described above, in some cases, it is not accurately judged whether the content has actually been browsed. For example, the visibility of the video advertisement is not sometimes accurately judged depending on the size of a video advertisement or the position of a beacon.

SUMMARY OF THE INVENTION

It is an object of the present invention to at least partially solve the problems in the conventional technology.

According to one aspect of the subject matter described in this disclosure, a non-transitory computer readable storage medium having an arrangement program stored thereon causes a computer to execute a process including (i) acquiring browsing mode information that indicates a mode of browsing content, and (ii) arranging, in the mode based on the browsing mode information acquired at the acquiring, at least one element that is used to judge whether the content has actually been browsed by a user in a content area in which the content is provided.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2A is a diagram illustrating an example of an element arrangement process for arranging an element that is used to judge whether the content has actually been browsed according to an illustrative embodiment of the present disclosure;

FIG. 2B is a diagram illustrating an example of an element arrangement process for arranging an element that is used to judge whether the content has actually been browsed according to an illustrative embodiment of the present disclosure;

DETAILED DESCRIPTION OF THE PREFERRED EMBODIMENTS

Figure 1A:
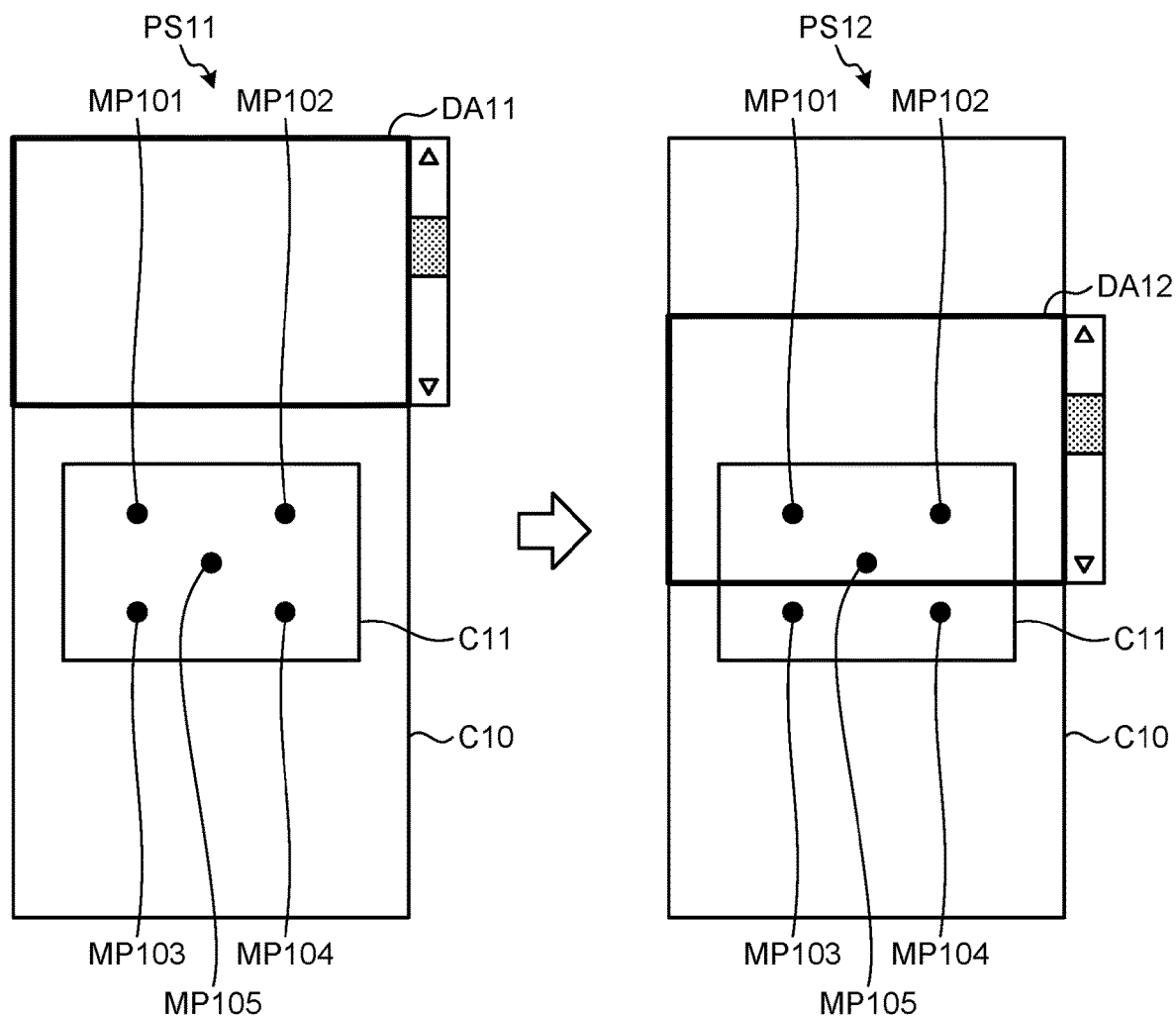
FIG. 1A is a diagram illustrating an example of a browsing judging process for judging whether content has actually been browsed.

Preferred embodiments of the present disclosure will be described in detail below with reference to the drawings. Furthermore, the present invention is not limited to the embodiment. Details of one or a plurality of embodiments will be described in the following explanations and drawings. Furthermore, the plurality of embodiments can be appropriately used in combination as long as the content of processes does not conflict with each other. Furthermore, the one or the plurality of embodiments below, the same components are denoted by the same reference numerals and an overlapping description will be omitted.

1. Illustrative Embodiment

First, an illustrative embodiment according to the present disclosure will be described in detail with reference to FIG. 1.

1-1. Outline of Illustrative Embodiment

The Viewability (also called a "browsing possibility") is advocated as an index to know whether content has actually been browsed. A terminal device according to the illustrative embodiment dynamically sets a reference element in a content area in accordance with a mode of browsing content (for example, the size of displayed content). Then, the terminal device measures the viewability of the content by monitoring a visibility state of the reference element. Flexibility of setting of the reference element makes it possible to measure the viewability with high accuracy.

1-2. Introduction of the Illustrative Embodiment

Content, such as advertisement content, is displayed on a content slot (for example, an ad spot) in online content, such as content in a web page or in an app. Various metrics for measuring the performance of displayed content (for example, advertisement content) are used in ad network. For example, an impression is one of the well known metrics. An impression is generated when content is delivered to a content slot. In other words, if content is loaded, an impression is generated. Therefore, even if the content is displayed on an invisible area (for example, outside of the display area of the browser) of the online content, the impression of the content is counted as "1". In order to further accurately grasp the browsing status of the content, the metric called "viewability" is proposed.

The term "viewability" includes a browsing state of content, such as "whether the content has actually been browsed by a user" or "whether the content is in a state in which the content available to be browsed (also called "viewable"). The impression at the time in which the content is actually available to be browsed by a user is also called "viewable impression". For example, if at least a part of content is displayed in a visible area (for example, a display area of a browser) of the online content, the viewable impression of this content is counted as a viewable impression of "1". As an example, the Interactive Advertising Bureau (IAB) defines the viewable impression as "an impression in which at least 50% of a content area is available to be browsed for one second".

From a viewpoint of the viewable impression defined by the IAB, if at least 50% of a content area is available to be browsed for one second, it is judged that content has actually been browsed. Accordingly, it is conceivable that a distributor of the content places five measurement points into the content area in order to judge whether the content has actually been browsed. If more than half the numbers of measurement points are drawn, it is judged that at least 50% of the content area is available to be browsed. The measurement point can be implemented by an application programming interface (API) that judges whether, for example, a data point has been drawn on a screen. The API that judges drawing (also called "rendering") allows a script, such as JavaScript (registered trademark), to measure the visibility of the element included in the content. In other words, this type of API allows the measurement script to measure the visibility of the area (for example, pixels) associated with the position at which the measurement point is arranged.

FIG. 1A is a diagram illustrating an example of a browsing judging process for judging whether content has actually been browsed. As illustrated in FIG. 1A, the terminal device loads main content and performs five-point measurement in sub content included in the main content. For example, five measurement points are placed in the sub content. The terminal device is, for example, a client device, such as a personal computer (PC) or a smartphone. The main content is, for example, an advertisement posting site that provides various kinds of information or various services on the Internet. The sub content in the main content is, for example, advertisement content (for example, an advertisement element) posted on an advertisement posting site.

The advertisement content may also be registered in an ad network. Furthermore, the advertisement posting site may also be placement in the ad network. In this case, a distributor of the sub content (for example, advertisement content) is an ad network company that provides the ad network. Therefore, the ad network company can be different from a company (also called "publisher") that provides an advertisement posting site. If the main content is a web page, the sub content (for example, advertisement content) can be exhibited in an iframe as a part of a web page. Because the ad network company is a third party, in general, the ad network company is not able to freely control elements that are outside of the iframe. Accordingly, it is conceivable that the ad network company places a measurement point into the iframe in which an element is able to be freely controlled. The measurement script is able to measure the viewability of the measurement points in the iframe.

In the example illustrated in FIG. 1A, it is assumed that, after a scroll operation is performed by a user of the terminal device, at least 50% of the sub content area is in a viewable state. A "white arrow" illustrated in FIG. 1A indicates that a processing step moves to the next stage.

A processing step PS11 indicates a first processing step. At the processing step PS11, the terminal device receives content C10. The content C10 is the main content (for example, a web page) described above. The display area DA11 is a visible area of the content C10. The display area DA11 is, for example, a screen (for example, a display area of a browser) of the terminal device. The content C10 includes content C11. The content C11 is the sub content (for example, the advertisement content) described above. The area of the content C11 includes a measurement point MP101, a measurement point MP102, a measurement point MP103, a measurement point MP104, and a measurement point MP105. The area of the content C11 is an iframe in which, for example, the content C11 (for example, an image of an advertisement or a text of an advertisement) is present.

As illustrated in FIG. 1A, the measurement point MP101, the measurement point MP102, the measurement point MP103, the measurement point MP104, and the measurement point MP105 are placed at five points corresponding to the upper left, the upper right, the lower left, the lower right, and the center of the area (for example, an iframe) in the content C11, respectively.

A processing step PS12 indicates a second processing step. At the processing step PS12, the terminal device scrolls the content C10. The display area DA12 is a visible area of the content C10. As illustrated in FIG. 1A, at the processing step PS12, at least 50% of the area of the content C11 is in a viewable state. In contrast, the measurement point MP101, the measurement point MP102, and the measurement point MP105 are present in the display area DA12, whereas the measurement point MP103 and the measurement point MP104 are present outside the display area DA12. Accordingly, more than half of the measurement points (i.e., three or more measurement points) are drawn by the terminal device. In other words, more than half of the measurement points are displayed at a position at which a user is able to perform browsing. In this case, the terminal device judges that the content C11 (for example, advertisement content) is in a viewable state.

However, in the five-point measurement described above, there may be a case in which the terminal device is not appropriately be able to measure the viewability of the sub content. For example, if the sub content is vertically long content (for example, advertisement content in a banner shape), there may be a case in which the terminal device judges that the sub content is not in a viewable state regardless of the state in which at least 50% of the area of the sub content is in a viewable state.

Figure 1B:
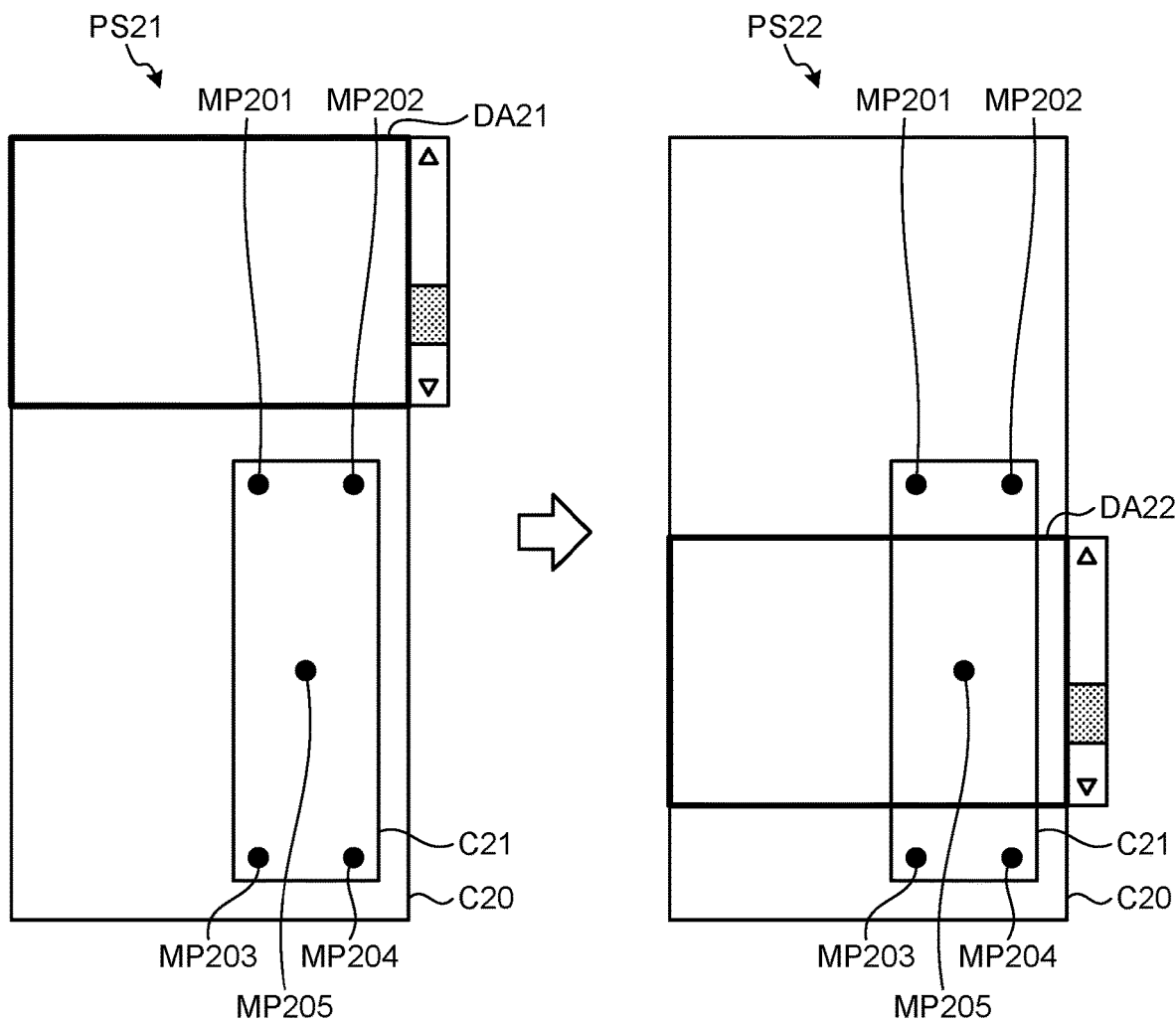
FIG. 1B is a diagram illustrating an example of the browsing judging process for judging whether content has actually been browsed.

FIG. 1B is a diagram illustrating an example of the browsing judging process for judging whether the content has actually been browsed. Similarly to the case of the content C10, the terminal device loads the main content and performs five-point measurement in the sub content included in the main content. Here, an overlapping description will be omitted.

In the example illustrated in FIG. 1B, similarly to the case of the content C10, it is assumed that, after a scroll operation has been performed by a user of the terminal device, at least 50% of the area of the sub content is in a viewable state. The "white arrow" illustrated in FIG. 1B indicates that the processing step moves to the next step.

A processing step PS21 indicates the first processing step. At the processing step PS21, the terminal device receives content C20. The content C20 is the main content described above. The display area DA21 is a visible area of the content C20. The content C20 includes content C21. The content C21 is the sub content described above. The area (for example, an iframe) of the content C21 includes a measurement point MP201, a measurement point MP202, a measurement point MP203, a measurement point MP204, and a measurement point MP205.

Similarly to the case of the content C10, the measurement point MP201, the measurement point MP202, the measurement point MP203, measurement point MP204, and the measurement point MP205 are placed at five points corresponding to the upper left, the upper right, the lower left, the lower right, and the center of the area (for example, an iframe) in the content C21, respectively.

A processing step PS22 indicates a second processing step. At the processing step PS12, the terminal device scrolls the content C20. The display area DA22 is a visible area of the content C20. As illustrated in FIG. 1B, at the processing step PS22, at least 50% of the area of the content C21 is in a viewable state. In contrast, the measurement point MP205 is present in the display area DA22, whereas the measurement point MP201, the measurement point MP202, the measurement point MP203, and the measurement point MP204 are present outside the display area DA22. Accordingly, more than half of the measurement points (i.e., three or more measurement points) are not drawn by the terminal device. In this case, the terminal device judges that the content C21 (for example, advertisement content) is not in a viewable state regardless of the state in which at least 50% of the area of the content C21 is in a viewable state.

In this way, in the simple five-point measurement, in some cases, the terminal device is not able to accurately measure the viewability of the sub content depending on the size of the sub content. For example, the viewability of vertically long sub content or horizontally long sub content is less likely to be appropriately measured in a case in which only 50% of the sub content area at the center of the sub content is in a viewable state. This is because the four points of upper left, the upper right, the lower left, and the lower right of the sub content area are possibly present outside the display area. In this case, because more than half of the measurement points (i.e., three or more measurement points) are not drawn by the terminal device, the terminal device judges that the sub content is not viewable regardless of the state in which 50% of the sub content area is in a viewable state.

Thus, the terminal device according to the illustrative embodiment performs an element arrangement process described below in order to judge, with high accuracy, whether the content (for example, the sub content, such as advertisement content) has actually been browsed.

1-3. Element Arrangement Process

In the following, an element arrangement process according to the illustrative embodiment will be described with reference to FIG. 2A and FIG. 2B.

FIG. 2A and FIG. 2B are diagrams each illustrating an example of the element arrangement process for arranging an element that is used to judge whether the content has actually been browsed according to an illustrative embodiment of the present disclosure. In the illustrative embodiment, the element arrangement process is performed by a terminal device 100 that will be described later with reference to FIG. 3. The terminal device 100 is an example of an arrangement device.

Similarly to the content C10 illustrated in FIG. 1A and the content C20 illustrated in FIG. 1B, the terminal device 100 loads the main content. In the examples illustrated in FIG. 2A and FIG. 2B, in contrast to the content C10 and the content C20, the measurement point is not previously placed in the sub content area (for example, an iframe) included in the main content. It is assumed that, after the scroll operation is performed by the user of the terminal device 100, at least 50% of the sub content area is in a viewable state. Each of the "white arrows" illustrated in FIG. 2A and FIG. 2B indicates that the processing step moves to the next step. Here, an overlapping description will be omitted.

When referring to FIG. 2A, a processing step PS31 indicates the first processing step. At processing step PS31, similarly to the case of the processing step PS11 illustrated in FIG. 1A, the terminal device 100 receives the content C10. As described above with reference to FIG. 1A, the content C10 is the main content (for example, a web page). The content C11 is the sub content (for example, advertisement content) included in the content C10. The display area DA31 is a visible area of the content C10. The display area DA31 is, for example, a screen (for example, a display area of a browser) of the terminal device 100.

A processing step PS32 indicates the second processing step. At the processing step PS32, the terminal device 100 divides, based on the ratio of the width to the height (also called an "aspect ratio") of the content C11, the area (for example, an iframe) of the content C11 into a plurality of areas. Then, the terminal device 100 arranges a plurality of measurement points into the plurality of areas.

Regarding the ratio of the width to the height of the sub content, the terminal device 100 can acquire the size (also called "dimensions") of the sub content that is displayed on the content slot included in the main content. For example, after the sub content is loaded, the terminal device 100 can acquire the size of the sub content that is actually displayed on the content slot. The terminal device 100 can refer to the property related to the ratio of the width to the height of the sub content that is displayed on, for example, the content slot. Furthermore, the terminal device 100 may also acquire the original size of the image from the element that is used to exhibit the image of the sub content. Alternatively, the terminal device 100 may also acquire the original size of the image from a predetermined repository (for example, a predetermined path).

Regarding the arrangement of the measurement points, if the shape of the sub content is a rectangle, for example, first, the terminal device 100 divides "the length of the long sides of the sub content" by "half the length of the short sides of the sub content". Then, the terminal device 100 divides "the length of the long sides of the sub content" by the quotient of the integer value that is obtained by the division and decides the quotient. The terminal device 100 is able to decide the quotient by significant figures having the predetermined number of digits. Then, the terminal device 100 divides the sub content area into a plurality of rectangular areas in each of which the length of the long sides is "the decided quotient" and the length of the short sides is "half the length of the short sides of the sub content". After that, the terminal device 100 arranges the measurement point at the center of each of the plurality of rectangular areas.

In this way, the terminal device 100 is able to divide the sub content area into the plurality of rectangular areas such that the number of rectangular areas in each of which the length of the short sides is "half the length of the short sides of the sub content" is the maximum. Then, the terminal device 100 is able to arrange the plurality of measurement points at the plurality of geometric centers that are associated with the plurality of rectangular areas, respectively.

In the example illustrated in FIG. 2A, the terminal device 100 divides the area of the content C11 into a plurality of rectangular areas and arranges the measurement point MP301, the measurement point MP302, the measurement point MP303, and the measurement point MP304 into the plurality of rectangular areas.

From a standpoint of a viewable impression defined by the IAB, as illustrated in FIG. 2A, the terminal device 100 may also arrange the measurement point MP305 at the center of the sub content area. For example, if the terminal device 100 scrolls the main content in the vertical direction and if the number of vertical directions of the plurality of rectangular areas is an even number, the terminal device 100 may also arrange the measurement point at the center of the sub content area. In contrast, if the terminal device 100 scrolls the main content in the vertical direction and if the number of vertical directions of the plurality of rectangular areas is an odd number, the terminal device 100 does not need to arrange the measurement point at the center of the sub content area. This is because, the measurement point is located on the center line of the sub content area in the vertical direction. If the shape of the sub content is a rectangle and if the shape of the display area of the browser is a rectangle, the center line of the sub content area in the vertical direction corresponds to a boundary of 50% of the sub content area. In this way, the terminal device 100 may also arrange the measurement points in the sub content area in accordance with the definition of the viewable impression.

A processing step PS33 indicates a third processing step. At the processing step PS33, the terminal device 100 scrolls the content C10. The display area DA32 is a visible area of the content C10. As illustrated in FIG. 2A, at the processing step PS33, at least 50% of the area of the content C11 is in a viewable state. In contrast, the measurement point MP301, the measurement point MP302, and the measurement point MP305 are present in the display area DA32, whereas the measurement point MP303 and the measurement point MP304 are present outside of the display area DA32. Because more than half of the measurement points are displayed on a position at which the user is able to perform browsing, the terminal device 100 judges that the content C11 (for example, advertisement content) is in a viewable state. If the sub content area is closer to square, similarly to a case of the five-point measurement described above, the terminal device 100 can measure the viewability of the sub content.

When referring to FIG. 2B, a processing step PS41 indicates the first processing step. At the processing step PS41, similarly to the case at the processing step PS21 illustrated in FIG. 1B, the terminal device 100 receives the content C20. As described above with reference to FIG. 1B, the content C20 is the main content (for example, a web page). The content C21 is sub content (for example, advertisement content) included in the content C20. The display area DA41 is a visible area of the content C20. The display area DA41 is, for example, a screen (for example, a display area of a browser) of the terminal device 100.

A processing step PS42 indicates the second processing step. At the processing step PS42, similarly to the case of the processing step PS32 illustrated in FIG. 2A, the terminal device 100 can arrange a plurality of measurement points into the plurality of areas by dividing the sub content area into a plurality of areas based on the ratio of the width to the height of the sub content. Here, an overlapping description will be omitted.

In the example illustrated in FIG. 2B, the terminal device 100 divides the area of the content C21 into a plurality of rectangular areas. Then, the terminal device 100 arranges a measurement point MP401, a measurement point MP402, a measurement point MP403, a measurement point MP404, a measurement point MP405, a measurement point MP406, a measurement point MP407, a measurement point MP408, a measurement point MP409, a measurement point MP410, a measurement point MP411, and a measurement point MP412 into the plurality of rectangular area. In addition, the terminal device 100 arranges a measurement point MP413 at the center of the area of the content C21.

A processing step PS43 indicates the third processing step. At the processing step PS43, the terminal device 100 scrolls the content C20. The display area DA42 is a visible area of the content C20. As illustrated in FIG. 2B, at the processing step PS43, at least 50% of the area of the content C21 is in a viewable state. In contrast, the measurement point MP403, the measurement point MP404, the measurement point MP405, the measurement point MP406, the measurement point MP407, the measurement point MP408, the measurement point MP409, the measurement point MP410, and the measurement point MP413 are present in the display area DA42, whereas the measurement point MP401, the measurement point MP402, the measurement point MP411, and the measurement point MP412 are present outside the display area DA42. Because more than half of the measurement points are displayed at a position at which the user is able to perform browsing, the terminal device 100 judges that the content C21 (for example, advertisement content) is in a viewable state. In this way, even when the sub content area has a vertically long rectangular shape, the terminal device 100 can accurately measure the viewability of the sub content.

In the example illustrated in FIG. 2A and FIG. 2B, after the viewability of the sub content is measured, the terminal device 100 transmits a measurement log to an advertisement delivery device 300. For example, the measurement log is able to indicate that the sub content is viewable. Alternatively, after the measurement of the visibility state of the measurement point, the terminal device 100 may also transmit the measurement log to the advertisement delivery device 300. In this case, the measurement log is able to indicate that the measurement point has been displayed in a visible state. The advertisement delivery device 300 can measure the viewability of the sub content based on the measurement log transmitted from the terminal device 100.

1-4. Effects of the Illustrative Embodiment

As described above, the terminal device 100 according to the illustrative embodiment divides the content area (for example, an advertisement area) into a plurality of areas based on the ratio of the width to the height of the content (for example, the advertisement content) and places the measurement point into each of the plurality of areas. Then, the terminal device 100 measures the display status of the content (for example, the viewability of the advertisement content) in accordance with the display status of the plurality of measurement points. Accordingly, the terminal device 100 can change the number of or the position of measurement points in accordance with the ratio of the width to the height of the content, whereby the terminal device 100 can measure the viewability of the content with high accuracy.

In the following, the terminal device 100 that performs the above described element arrangement process will be described in detail.

2. Browsing Judging System

In the following, a configuration example of a system including the terminal device 100 will be described with reference to FIG. 3.

2-1. Components of the Browsing Judging System

Figure 3:
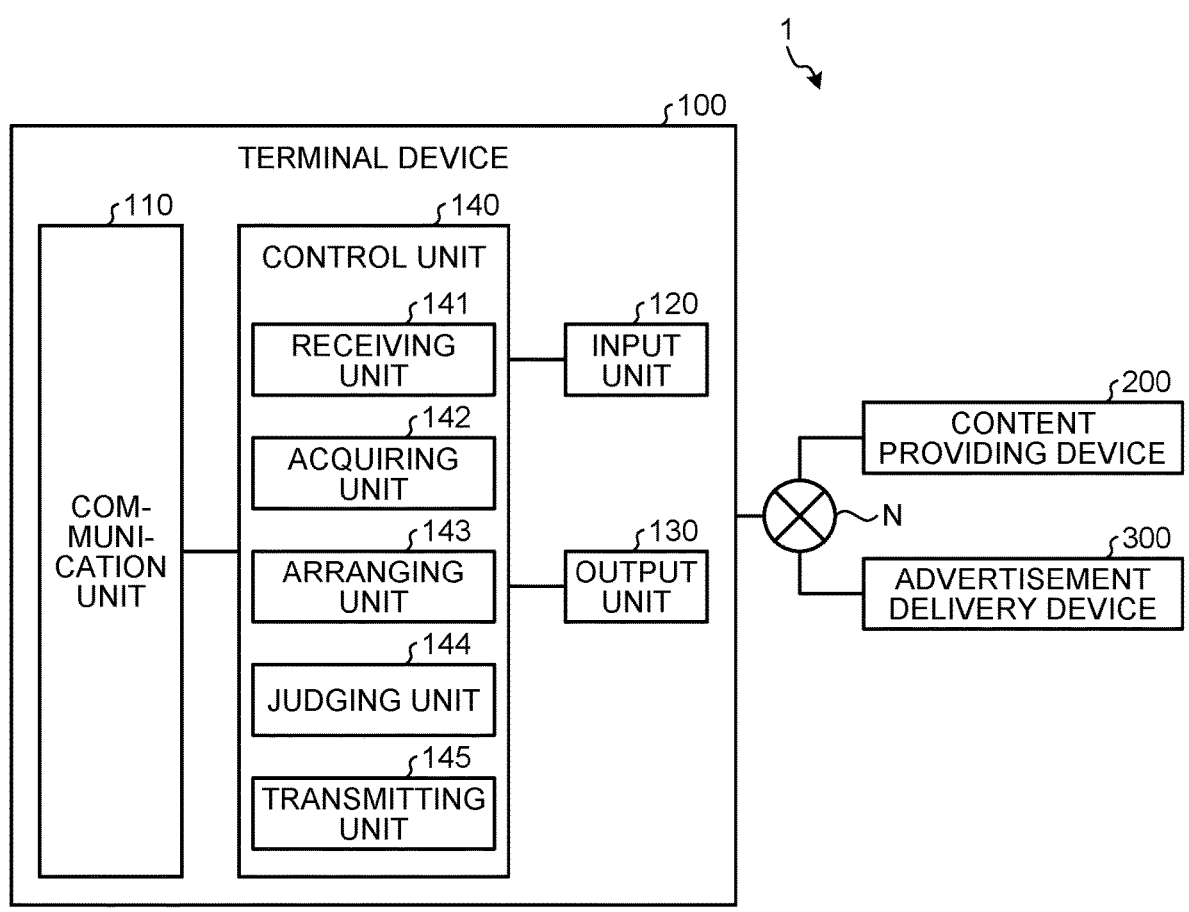
FIG. 3 is a diagram illustrating an example of a browsing judging system according to the embodiment.

FIG. 3 is a diagram illustrating an example of a browsing judging system 1 according to an embodiment. As illustrated in FIG. 3, the browsing judging system 1 includes components, such as the terminal device 100, a content providing device 200, and an advertisement delivery device 300. Although not illustrated in FIG. 1, the browsing judging system 1 may also include a plurality number of the terminal devices 100, a plurality number of the content providing devices 200, and a plurality number of the advertisement delivery devices 300. Furthermore, the browsing judging system 1 may also include another component, such as a device of an entity (for example, a business operator, an end user) related to the terminal device 100.

In the browsing judging system 1, each of the terminal device 100, the content providing device 200, and the advertisement delivery device 300 is connected to a network N in a wired or a wireless manner. The network N is a network, such as the Internet, a wide area network (WAN) or a local area network (LAN). The components of the browsing judging system 1 can perform communication with each other via the network N.

The terminal device 100 (corresponding to an example of an arrangement device) is an information processing apparatus that performs a process for measuring a display mode of content. The terminal device 100 can allocate the element that is used to judge whether the content has actually been browsed to the content. The terminal device 100 may also be an arbitrary type of information processing apparatus including a client device, such as a smartphone, a desktop type PC, a notebook type PC, or a tablet type PC. A configuration example of the terminal device 100 will be described in detail in a next section.

The content providing device 200 is an information processing apparatus that provides content, such as content in a web page or in an app, to the terminal device 100. The content providing device 200 is able to provide a web page via a browser used by the terminal device 100. Furthermore, the content providing device 200 is able to provide the content in an app via an app, such as a native app, that is installed in the terminal device 100. The content provided by the content providing device 200 is able to include an instruction (also called as an advertisement code) to request advertisement content.

The advertisement delivery device 300 is an information processing apparatus that delivers advertisement content to a content slot included in the content provided by the content providing device 200. If the terminal device 100 requests advertisement content in accordance with an instruction included in the content, the advertisement delivery device 300 is able to deliver the advertisement content to the terminal device 100. The advertisement delivery device 300 may also decide the advertisement content to be delivered based on user information (for example, a demographic attribute or a psychographic attribute) on a user who uses the terminal device 100 or based on various kinds of data (for example, a bid price or quality of advertisement) related to the advertisement content.

2-2. Configuration of the Terminal Device

As illustrated in FIG. 3, the terminal device 100 includes a communication unit 110, an input unit 120, an output unit 130, and a control unit 140.

Communication Unit 110

The communication unit 110 is implemented by, for example, a network interface card (NIC), or the like. The communication unit 110 is connected to a network in a wired or wireless manner. The communication unit 110 may also be connected to the content providing device 200 and the advertisement delivery device 300 via the network N so as to be capable of performing communication with each other. The communication unit 110 can transmit and receive information to and from the content providing device 200 and the advertisement delivery device 300 via the network.

Input Unit 120

The input unit 120 is an input device that receives various operations from the user of the terminal device 100. For example, the input unit 120 is implemented by a keyboard, a mouse, an operation key, or the like.

Output Unit 130

The output unit 130 is a display device for displaying various kinds of information. For example, the output unit 130 is implemented by a liquid crystal display or the like. Furthermore, if a touch panel is used for the terminal device 100, the input unit 120 and the output unit 130 are integrated as a single unit.

Control Unit 140

The control unit 140 is a controller and is implemented by, for example, a central processing unit (CPU), a micro processing unit (MPU), or the like, executing various kinds of programs (corresponding to an example of an arrangement program), which are stored in a storage device in the terminal device 100, by using a RAM as a work area. For example, these various kinds of programs corresponds to an application program that is called as a web browser and an application software that is called as a mobile application. Furthermore, the control unit 140 is a controller and may also be implemented by, for example, an integrated circuit, such as an application specific integrated circuit (ASIC), a field programmable gate array (FPGA), a general purpose graphic processing unit (GPGPU), or the like.

As illustrated in FIG. 3, the control unit 140 includes a receiving unit 141, an acquiring unit 142, an arranging unit 143, a judging unit 144, and a transmitting unit 145 and implements or executes the function or the operation of the information processing described below. Furthermore, the control unit 140 is able to implement the element arrangement process described above with reference to FIG. 2A and FIG. 2B. One or a plurality of processors included in the terminal devices 100 is able to implement the function of each of the control units included in the control unit 140 by performing the instructions stored in one or a plurality of memories included in the terminal devices 100. Furthermore, the internal configuration of the control unit 140 is not limited to the configuration illustrated in FIG. 3 and another configuration may also be used as long as the configuration in which the information processing described below is performed. For example, the arranging unit 143 may also perform the whole or a part of the information processing described below related to the units other than the arranging unit 143.

Receiving Unit 141

The receiving unit 141 is able to transmit, to the content providing device 200 in accordance with an operation performed by the user of the terminal device 100, an acquisition request for the content, such as content in a web page or in an app. The receiving unit 141 is able to receive the content from the content providing device 200 as a response to the acquisition request for the content. The received content is able to include an instruction to request advertisement content (for example, an advertisement code described in a client-side script, such as JavaScript). This instruction is able to allow the receiving unit 141 included in the terminal device 100 to acquire the advertisement content from a predetermined repository (for example, a predetermined path). As will be described later, this instruction is able to allow the receiving unit 141 to receive the advertisement content from the advertisement delivery device 300.

The receiving unit 141 is able to transmit, to the advertisement delivery device 300, an acquisition request for the content, such as the advertisement content, in accordance with the instruction included in the content that has been received from the content providing device 200. The receiving unit 141 is able to receive, as a response to the acquisition request for the advertisement content, the control information from the advertisement delivery device 300 together with the advertisement content. The receiving unit 141 is able to receive the control information as a client-side script.

The control information is able to allow the control unit 130 to perform information processing, which will be described later, related to the acquiring unit 142, the arranging unit 143, the judging unit 144, and the transmitting unit 145. The control information is a program that is described in, for example, a script language, such as JavaScript.

Acquiring Unit 142

The acquiring unit 142 is implemented by, for example, a CPU, an MPU, or the like, executing the control information described above by using a RAM as a work area. For example, the control information described above allows the terminal device 100 to perform an acquiring process. In this case, the acquiring unit 142 is implemented by the acquiring process.

The acquiring unit 142 is able to acquire various kinds of information that is used to judge whether the content has actually been browsed by the user. The acquiring unit 142 is able to acquire, as various kinds of information, browsing mode information that indicates a mode of browsing the content. The acquiring unit 142 is able to acquire various kinds of information from various kinds data (for example, the content) received by the receiving unit 141. Furthermore, the acquiring unit 142 is able to acquire various kinds of information from a predetermined repository (for example, a predetermined path). For example, the acquiring unit 142 is able to acquire various kinds of information from the advertisement delivery device 300.

In at least one embodiment, the acquiring unit 142 acquires the browsing mode information that indicates the mode of browsing the content. For example, the acquiring unit 142 acquires information that indicates the shape of the content as the browsing mode information. Furthermore, for example, the acquiring unit 142 acquires the size of the content as the information that indicates the shape of the content.

As an example, the acquiring unit 142 is able to acquire the size of the sub content that is displayed on the content slot included in the main content. For example, after the sub content is loaded, the acquiring unit 142 is able to acquire the size of the sub content that is actually displayed on the content slot. The acquiring unit 142 is able to refer to the property related to the ratio of the width to the height of the sub content displayed on, for example, the content slot. Furthermore, the acquiring unit 142 may also acquire the original size of an image from the element that is used to display the image of the sub content. Alternatively, the terminal device 100 may also acquire the original size of the image from a predetermined repository (for example, a predetermined path), such as a storage device, of the advertisement delivery device 300.

Arranging Unit 143

The arranging unit 143 is implemented by, for example, a CPU, an MPU, or the like executing the control information described above by using the RAM as a work area. For example, the control information described above allows the terminal device 100 to perform an arranging process. In this case, the arranging unit 143 is implemented by the arranging process.

The arranging unit 143 is able to decide an arrangement mode of the element that is used to judge whether the content has actually been browsed by the user based on the browsing mode information acquired by the acquiring unit 142. For example, the arranging unit 143 is able to decide the number of or the position of the elements based on the browsing mode information.

In at least one embodiment, the arranging unit 143 arranges, in the mode based on the browsing mode information acquired by the acquiring unit 142, at least one element that is used to judge whether the content has actually been browsed by the user into the content area in which the content is provided.

In at least one embodiment, at least one element includes a plurality of elements that is used to judge whether the content has actually been browsed by the user. In at least one embodiment, the arranging unit 143 divides, based on the browsing mode information, the content area into a plurality of areas and arranges the plurality of elements into the plurality of areas.

The arranging unit 143 is able to divide the area of the content into a plurality of areas in accordance with the ratio of the width to the height of the content acquired by the acquiring unit 142. Then, the arranging unit 143 is able to place each of the plurality of measurement points to the plurality of associated areas.

In an example, the arranging unit 143 divides the area (for example, an iframe) of the content into a plurality of areas based on the ratio of the width to the height of the content (also called an "aspect ratio"). Then, the arranging unit 143 arranges the plurality of measurement points into the plurality of associated areas. Each of the measurement points is able to be implemented as a drawing measurement point that is used to measure, for example, a part of the drawing of the content.

Regarding the arrangement of the measurement points, if the shape of the sub content is a rectangle, for example, first, the arranging unit 143 divides "the length of the long sides of the sub content" by "half the length of the short sides of the sub content". Then, the arranging unit 143 divides "the length of the long sides of the sub content" by the quotient of the integer value that is obtained by the division and decides the quotient. The arranging unit 143 is able to decide the quotient by significant figures having the predetermined number of digits. Then, the arranging unit 143 divides the sub content area into a plurality of rectangular areas in each of which the length of the long sides is "the decided quotient" and the length of the short sides is "half the length of the short sides of the sub content". After that, the arranging unit 143 arranges the measurement point at the center of each of the plurality of rectangular areas.

In this way, the arranging unit 143 is able to divide the sub content area into the plurality of rectangular areas such that the number of rectangular areas in each of which the length of the short sides is "half the length of the short sides of the sub content" is the maximum. Then, the arranging unit 143 is able to arrange the plurality of measurement points at the plurality of geometric centers that are associated with the plurality of rectangular areas, respectively.

As described above with reference to FIG. 2A, for example, the arranging unit 143 divides the area of the content C11 into a plurality of rectangular areas and arranges the measurement point MP301, the measurement point MP302, the measurement point MP303, and the measurement point MP304 in the plurality of respective rectangular areas.

From a standpoint of viewable impression defined by the IAB, as illustrated in FIG. 2A, the arranging unit 143 may also arrange the measurement point MP305 at the center of the sub content area. For example, if the terminal device 100 scrolls the main content in the vertical direction and if the number of vertical directions of the plurality of rectangular areas is an even number, the arranging unit 143 may also arrange the measurement point at the center of the sub content area. In contrast, if the terminal device 100 scrolls the main content in the vertical direction and if the number of vertical directions of the plurality of rectangular areas is an odd number, the arranging unit 143 does not need to arrange the measurement point at the center of the sub content area. This is because, the measurement point is located on the center line of the sub content area in the vertical direction. If the shape of the sub content is a rectangle and if the shape of the display area of the browser is a rectangle, the center line of the sub content area in the vertical direction corresponds to a boundary of 50% of the sub content area. In this way, the arranging unit 143 may also arrange the measurement points in the sub content area in accordance with the definition of the viewable impression. Judging unit 144

The judging unit 144 is implemented by, for example, a CPU, an MPU, or the like, executing the control information described above by using the RAM as a work area. For example, the control information described above allows the terminal device 100 to perform a judging process. In this case, the judging unit 144 is implemented by the judging process.

In at least one embodiment, the judging unit 144 judges whether at least one element arranged by the arranging unit 143 is displayed at a position at which browsing is available for the user.

If half of the plurality of measurement points arranged by the arranging unit 143 is in a visible state, the judging unit 144 is able to judge that 50% of the content area is visible. The judging unit 144 is able to check whether each of the measurement points is displayed in a visible manner at predetermined intervals (for example, every one second). The content (for example, advertisement content) is sometimes displayed by an operation of scrolling another content (for example, web page) that includes the subject content. Accordingly, the judging unit 144 may also check whether each of the measurement points is displayed in a visible manner at a point of time in which the other content is scrolled. For example, the judging unit 144 is able to monitor the visibility state of each of the measurement points by using the API of the browser.

As an example, if more than half of the measurement points are displayed on a position at which the user is able to perform browsing, the judging unit 144 judges that the content (for example, advertisement content) is in a viewable state. If the sub content area is in an approximately square shape, the judging unit 144 is able to measure the viewability of the sub content, similarly to the case of five-point measurement described above. Transmitting unit 145

The transmitting unit 145 is implemented by, for example, a CPU, an MPU, or the like, executing the control information described above by using a RAM as a work area. For example, the control information described above allows the terminal device 100 to perform a transmitting process. In this case, the transmitting unit 145 is implemented by the transmitting process.

In at least one embodiment, the transmitting unit 145 transmits, based on the judgement performed by the judging unit 144, the display state information related to the display state of the content.

For example, the transmitting unit 145 transmits, as the display state information, information indicating that at least one element has been displayed at the position at which browsing is available for the user.

Furthermore, for example, if the judgement obtained by the judging unit 144 satisfies a predetermined condition, the transmitting unit 145 transmits information indicating that the content has actually been browsed by the user. For example, if the judgement satisfies a predetermined condition that is a condition in which the ratio of the at least one element displayed at the position at which browsing is available for the user to at least one element exceeds a threshold, the transmitting unit 145 transmits the information indicating that the content has actually been browsed by the user.

As an example, after the viewability of the sub content is measured, the transmitting unit 145 transmits a measurement log to the advertisement delivery device 300. For example, measurement log is able to indicate that the sub content is viewable. Alternatively, after a visibility state of the measurement point is measured, the transmitting unit 145 may also transmit the measurement log to the advertisement delivery device 300. In other words, the judging unit 144 described above does not need to measure the viewability of the sub content. In this case, the measurement log is able to indicate that the measurement point has been displayed in a visible state. The advertisement delivery device 300 is able to measure the viewability of the sub content based on the measurement log transmitted from the transmitting unit 145.

3. Flow of the Element Arrangement Process

In the following, the flow of the element arrangement process performed by the terminal device 100 according to the embodiment will be described with reference to FIG. 4.

Figure 4:
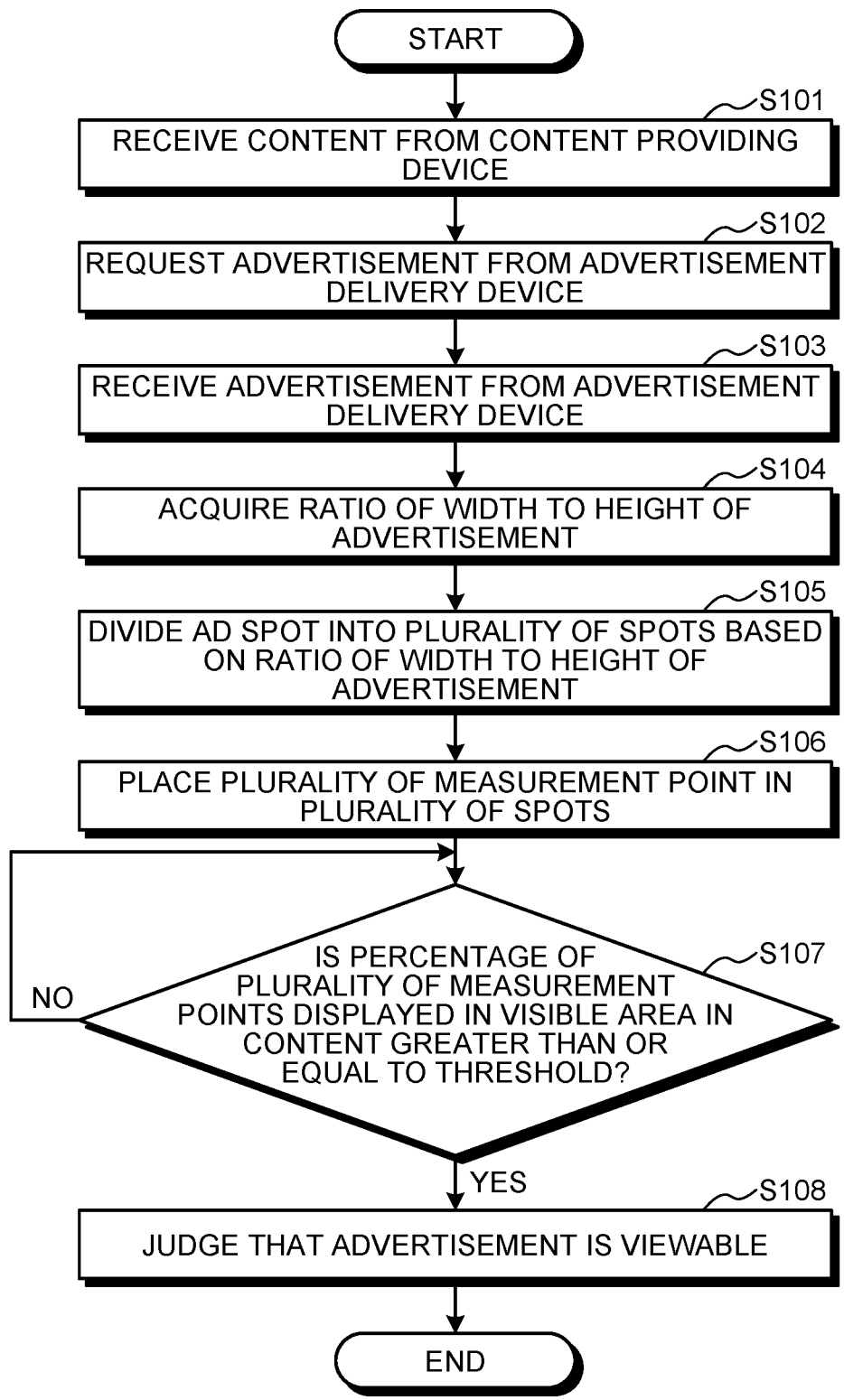
FIG. 4 is a flowchart illustrating an example of a process for measuring the viewability of an advertisement performed by a terminal device according to the embodiment.

FIG. 4 is a flowchart illustrating an example of a process for measuring the viewability of an advertisement performed by the terminal device 100 according to the embodiment.

As illustrated in FIG. 4, first, the receiving unit 141 included in the terminal device 100 receives content from the content providing device 200 (Step S101).

Then, the receiving unit 141 requests an advertisement from the advertisement delivery device 300 (Step S102).

Then, the receiving unit 141 receives the advertisement from the advertisement delivery device 300 (Step S103).

Then, the acquiring unit 142 in the terminal device 100 acquires the ratio of the width to the height of the advertisement received by the receiving unit 141 (Step S104).

Then, the arranging unit 143 in the terminal device 100 divides, based on the ratio of the width to the height of the advertisement acquired by the acquiring unit 142, the ad spot in which the advertisement is displayed into a plurality of spots (Step S105).

Then, the arranging unit 143 places the plurality of measurement points into the plurality of corresponding frames, respectively (Step S106). In each of the measurement points placed in the respective frames, the viewability of the coordinates in which each of the measurement points is placed is measured. For example, the arranging unit 143 places a measurement point at the center of each of the frames.

Then, the judging unit 144 in the terminal device 100 judges whether a percentage of the plurality of measurement points displayed on the visible area in the content is greater than or equal to the threshold (Step S107). For example, the judging unit 144 judges whether the percentage of the plurality of measurement points displayed in the visible area for more than one second is greater than or equal to 50%.

If the judging unit 144 judges that the percentage of the plurality of measurement points displayed in the visible area of the content is not greater than or equal to the threshold (No at Step S107), the judging unit 144 again performs the process at Step S107. If the judging unit 144 judges that the percentage of the plurality of measurement points displayed in the visible area of the content is greater than or equal to the threshold (Yes at Step S107), the judging unit 144 judges that the advertisement is viewable (Step S108). Namely, if half of the measurement points is displayed in a visible manner, the judging unit 144 judges that the advertisement is displayed in a viewable state.

4. Other Embodiments

The terminal device 100 according to the embodiment described above may also be performed with various kinds of embodiments other than the embodiments described above. Therefore, in the following, another embodiment of the above described terminal device 100 will be described.

4-1. Placement of Drawing Completion Point

In some embodiments, the arranging unit 143 may also place, in an in visible area located outside the content area, another element that is used to control a judgement timing performed by the judging unit 144. In some embodiments, if another element arranged by the arranging unit 143 is displayed at a position at which browsing is available for the user, the judging unit 144 may also judge whether at least one element has been displayed at a position at which browsing is available for the user.

In a specific operating environment (for example, a specific browser), there may be a case in which the above described measurement script (for example, a program that causes a computer to execute a judging process or a transmitting process) is executed before the completion of drawing of the measurement point. Thus, in order to adjust an execution timing of the measurement script, the arranging unit 143 may also place a drawing completion point in an invisible area outside the area of the sub content (for example, advertisement content). After the completion of drawing of the drawing completion point, the judging unit 144 may also judge the visibility state of the measurement point. The completion of the drawing of the drawing completion point is able to indicate the state in which the measurement point can be measured. Accordingly, the terminal device 100 can measure the viewability at an appropriate timing.

4-2. Arrangement of Elements Based on an Operating Characteristic

In some embodiments, the acquiring unit 142 may also acquire, as the browsing mode information, information that indicates an operating characteristic with respect to the content.

For example, the acquiring unit 142 may also acquire, as the browsing mode information, information that indicates a tendency of a scroll speed of the user of the terminal device 100 from the advertisement delivery device 300. If an average scroll speed is high, the user may also be less likely to browse the content. In this case, the arranging unit 143 may also place a single measurement point at the center of the content area in order to reduce the load applied to the processor.

4-3. Arrangement of Elements Based on a Browsing Status

The acquiring unit 142 may also acquire, as the browsing mode information, the information that indicates the browsing status of the content from the advertisement delivery device 300. For example, a camera mounted on the terminal device 100 may also detect a line of sight of the user of the terminal device 100. Then, the information indicating the line of sight detected by the camera may also be transmitted to the advertisement delivery device 300. Accordingly, the advertisement delivery device 300 is able to generate, based on the information indicating the line of sight, the information that indicates the browsing status of the content. The arranging unit 143 may also places a measurement point in the area of the content based on the information that indicates the browsing status of the content. For example, if the user is highly likely to browse an eye catching image (for example, an advertising model or a mascot), the arranging unit 143 may also place a measurement point in an area associated with the eye catching position included in the area of the content.

4-4. Size of Screen

In general, the aspect ratio of the sub content does not vary according to the size of the screen of the terminal device 100. However, the size of the sub content to be displayed sometimes varies according to the size of the screen of the terminal device 100. Namely, the size of the sub content to be displayed is sometimes adjusted. The size of the content to be displayed is the actual size in a case in which this content is in a viewable state. The acquiring unit 142 may also acquire, as the browsing mode information, the information indicating the size of the content to be displayed. The arranging unit 143 may also place a measurement point in the area of the content based on the size of the content to be displayed. For example, if the size of the content to be displayed exceeds a threshold, the arranging unit 143 may also divide the area of the content into a predetermined number of areas (for example, 10 areas). Furthermore, for example, if the size of the content to be displayed does not exceed the threshold, the arranging unit 143 may also divide the area of the content into a predetermined number of areas (for example, four areas). If the other pieces of content including the subject content are displayed on the entire screen, the arranging unit 143 may also place a single measurement point at the center of the area of the content.

4-5. Browsing Log of Content

The acquiring unit 142 may also acquire, as the browsing mode information, a browsing history of the content from the advertisement delivery device 300. For example, the acquiring unit 142 may also acquire, as the browsing history of the content, a selection history that indicates that the content has been selected. The arranging unit 143 may also decide an arrangement mode of the measurement point that is used to measure the viewability of this content by comparing the browsing history of the content with the measurement point that is placed in the area of this content. As an example, it is assumed that a single measurement point is placed at the center of the area of the content. Furthermore, it is assumed that, if the content is selected, it is judged, with high accuracy, that this single measurement point is also viewable. In this example, the arranging unit 143 may also place the single measurement point at the center of the area of the content based on the selection history of the content and the log of the measurement point.

4-6. Implementation Configuration of Measurement Points

In some implementation configurations, a measurement point may also be implemented as a frame. For example, a plurality of measurement points may also be implemented as a plurality of iframes. The arranging unit 143 may also place a plurality of iframes in an iframe that is used to deliver advertisement. Then, the judging unit 144 may also measure each of the visibility of the plurality of iframes. For example, the browser API that measures the visibility of the frame allows the judging unit 144 to measure each of the visibility of the plurality of iframes. In this way, the judging unit 144 is able to monitor pixels in the advertisement area.

4-7. Implementation Configuration of Control Information

In the embodiment described above, the receiving unit 141 receives, from the advertisement delivery device 300, control information as a response to an acquisition request for the advertisement content together with the advertisement content; however, the embodiment is not limited to this. The receiving unit 141 may also receive the control information together with the content from the content providing device 200. The content received from the content providing device 200 may also include the control information. If the content received from the content providing device 200 is the content included in an app, the function implemented by the control information described above may also be implemented as a function of the app (for example, a mobile app).

4-8. Viewability of Video Advertisement

The advertisement content delivered by the advertisement delivery device 300 may also be video advertisement. Similarly to the case of the advertisement content with a still image, the terminal device 100 is able to divide the ad spot in which the video advertisement is delivered into a plurality of areas and place a measurement point in each of the plurality of areas. From the standpoint of the viewable impression defined by the IAB, if 50% of video advertisement area is available for browsing in a period of time for which video advertisement is being played for at least two seconds, the terminal device 100 judges that the video advertisement has actually been browsed.

4-9. Definition of the Viewability

The concept of the viewability is not limited to the definition of the viewability defined by the IAB. In some implementation configurations, the definition of the viewability can be decided in accordance with the state in which an entity (for example, an ad network company) desires to detect what kind of browsing mode. For example, the entity may also define the viewable impression by "the impression in which at least 80% of area of the content is available for browsing for at least three seconds". The arranging unit 143 may also decide an arrangement mode of the measurement point based on the definition of the viewability.

4-10. Type of Sub Content

The sub content is not limited to the advertisement content. The sub content may also be various kinds of content, such as promotion including a product link, an image, a video, or an embedded social networking service (SNS).

4-11. Execution Subject of the Element Arrangement Process Performed by the Terminal Device The advertisement delivery device 300 may also perform the whole or a part of the element arrangement process performed by the terminal device 100 in the embodiment described above. With some implementation configurations, the advertisement delivery device 300 may also perform the whole or a part of the above described information processing related to the acquiring unit 142 and the arranging unit 143. For example, the advertisement delivery device 300 may also acquire, from the storage device in the advertisement delivery device 300, the original size of the sub content as the browsing mode information. Then, the advertisement delivery device 300 may also arrange a measurement point in the sub content area based on the original size of the sub content. The advertisement delivery device 300 may also transmit the sub content in which the measurement point is previously arranged to the terminal device 100.

5. Others

Of the processes described in the embodiment, a part of the processes that are mentioned as being automatically performed can also be manually performed, or the whole or a part of the processes that are mentioned as being manually performed can also be automatically performed using known methods. Furthermore, the flow of the processes, the specific names, and the information containing various kinds of data or parameters indicated in the above specification and drawings can be arbitrarily changed unless otherwise stated. For example, the various kinds of information illustrated in each of the drawings are not limited to the information illustrated in the drawings.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions.

6. Hardware Configuration

Figure 5:
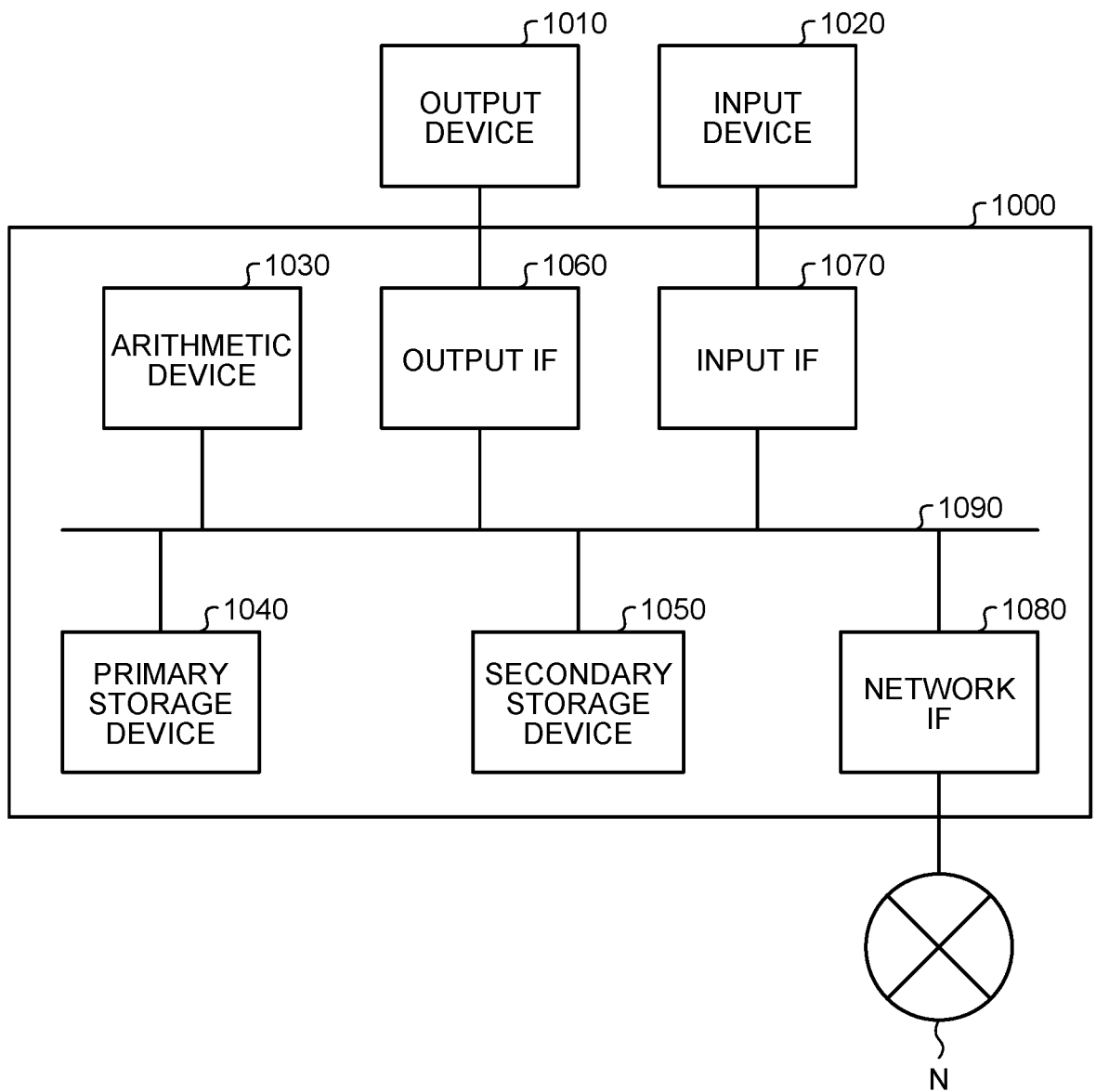
FIG. 5 is a diagram illustrating an example of a hardware configuration.

Furthermore, the terminal device 100 according to the embodiment described above is implemented by a computer 1000 having a configuration illustrated in, for example, FIG. 5. FIG. 5 is a diagram illustrating an example of a hardware configuration. The computer 1000 is connected to an output device 1010 and an input device 1020, and has a configuration in which an arithmetic device 1030, a primary storage device 1040, a secondary storage device 1050, an output I/F (Interface) 1060, an input IF 1070, and a network IF 1080 are connected by a bus 1090.

The arithmetic device 1030 is operated based on the programs stored in the primary storage device 1040 and the secondary storage device 1050 or based on the programs read from the input device 1020 and performs various kinds of processes. The primary storage device 1040 is a memory device, such as a RAM, that temporarily stores therein data that is used by the arithmetic device 1030 to perform various kinds of arithmetic operations. Furthermore, the secondary storage device 1050 is a storage device in which data that is used by the arithmetic device 1030 to perform various kinds of arithmetic operations and various databases are registered and is implemented by a read only memory (ROM), a hard disk drive (HDD), a flash memory, or the like.

The output I/F 1060 is an interface for transmitting information that is targeted for an output with respect to the output device 1010, such as a monitor or a printer, that outputs various kinds of information and is implemented by, for example, standard connector, such as a universal serial bus (USB), a digital visual interface (DVI), a high definition multimedia interface (registered trademark) (HDMI), or the like. Furthermore, the input IF 1070 is an interface for receiving the information from various kinds of the input devices 1020, such as a mouse, a keyboard, a scanner, or the like, and is implemented by, for example, a USB, or the like.

Furthermore, the input device 1020 may also be, for example, an optical recording medium, such as a compact disc (CD), a digital versatile disc (DVD), a phase change rewritable disk (PD), or the like; a magneto-optical recording medium, such as a magneto-optical disk (MO), or the like; or a device that reads information from a tape medium, a magnetic recording medium, a semiconductor memory, or the like. Furthermore, the input device 1020 may also be an external storage medium, such as a USB memory, or the like.

The network IF 1080 receives data from another device via the network N and sends the data to the arithmetic device 1030. Furthermore, the network IF 1080 sends the data generated by the arithmetic device 1030 to the other device via the network N.

The arithmetic device 1030 controls the output device 1010 and the input device 1020 via the output I/F 1060 and the input IF 1070. For example, the arithmetic device 1030 loads the program from the input device 1020 or the secondary storage device 1050 into the primary storage device 1040 and executes the loaded program.

For example, if the computer 1000 functions as the terminal device 100, the arithmetic device 1030 in the computer 1000 implements the function of the control unit 130 by executing the program loaded into the primary storage device 1040.

7. Effects

As described above, the terminal device 100 according to the embodiment includes the acquiring unit 142 and the arranging unit 143.

In the terminal device 100 according to the embodiment, the acquiring unit 142 acquires browsing mode information that indicates a mode of browsing content. Furthermore, in the terminal device 100 according to the embodiment, the arranging unit 143 arranges, in a mode based on the browsing mode information acquired by the acquiring unit 142, at least one element that is used to judge whether the content has actually been browsed by the user in a content area in which the content is provided.

Furthermore, in the terminal device 100 according to the embodiment, the acquiring unit 142 acquires, as the browsing mode information, information that indicates the shape of the content.

Furthermore, in the terminal device 100 according to the embodiment, the acquiring unit 142 acquires the size of the content as the information that indicates the shape of the content.

Furthermore, the terminal device 100 according to the embodiment includes the judging unit 144 that judges whether the at least one element arranged by the arranging unit 143 is displayed at a position at which browsing is available for the user. Furthermore, the terminal device 100 according to the embodiment includes the transmitting unit 145 that transmits, based on the judging unit 144, the display state information related to a display state of the content.

Furthermore, in the terminal device 100 according to the embodiment, the transmitting unit 145 transmits, as the display state information, information indicating that the at least one element has been displayed at the position at which browsing is available for the user.

Furthermore, in the terminal device 100 according to the embodiment, if the judgement obtained by the judging unit 144 satisfies a predetermined condition, the transmitting unit 145 transmits information indicating that the content has actually been browsed by the user.

Furthermore, in the terminal device 100 according to the embodiment, if the judgement satisfies the predetermined condition that is a condition in which the ratio of the at least one element that has been displayed at the position at which browsing is available for the user to at least one element exceeds a threshold, the transmitting unit 145 transmits the information indicating that the content has actually been browsed by the user.

Furthermore, in the terminal device 100 according to the embodiment, the arranging unit 143 arranges another element that is used to control a timing of the judgement obtained by the judging unit 144 in an invisible area that is located outside the content area. Furthermore, in the terminal device 100 according to the embodiment, if the other element arranged by the arranging unit 143 is displayed at the position at which browsing is available for the user, the judging unit 144 judges whether the at least one element has been displayed at the position at which browsing is available for the user.

Furthermore, in the terminal device 100 according to the embodiment, that at least one element includes a plurality of elements that is used to judge whether the content has actually been browsed by the user. Furthermore, in the terminal device 100 according to the embodiment, the arranging unit 143 divides the content area into a plurality of areas based on the browsing mode information and arranges the plurality of elements in the plurality of areas, respectively.

Furthermore, in the terminal device 100 according to the embodiment, the acquiring unit 142 acquires an operating characteristic with respect to the content as the browsing mode information.

Based on each of the processes described above, the terminal device 100 is able to judge, with high accuracy, whether the content has actually been browsed.

In the above, embodiments of the present invention have been described in detail based on the drawings; however the embodiments are described only by way of an example. In addition to the embodiments described in disclosure of invention, the present invention can be implemented in a mode in which various modifications and changes are made in accordance with the knowledge of those skilled in the art.

Furthermore, the "components (sections, modules, units)" described above can be read as "means", "circuits", or the like. For example, arranging unit can be read as an arranging circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer readable storage medium having an arrangement program stored thereon causes a computer to execute a process comprising:
   acquiring browsing mode information that indicates a mode of browsing content;
   arranging, in the mode based on the browsing mode information acquired at the acquiring, at least one element including a plurality of elements, that is used to judge whether the content has actually been browsed by a user in a content area in which the content is provided, wherein the arranging includes:
dividing, based on the browsing mode information, the content area into a plurality of areas and arranging each of the plurality of elements in a center of each of the plurality of areas for detection of viewable state, wherein the dividing involves dividing the content area into the plurality of areas based on a ratio of width to height of the content area;
if a number of the plurality of areas in a vertical direction is an even number, one of the at least one element is arranged in a center of the content area; and
if the number of the plurality of areas in the vertical direction is an odd number, the at least one element is not arranged in the center of the content area, wherein a middle area of the plurality of areas in the vertical direction serves as an element for judging;
judging whether the at least one element arranged at the arranging has been displayed at a position at which browsing is available for the user; and
transmitting, based on the judgement obtained at the judging, display state information related to a display state of the content, wherein the transmitting includes transmitting, when the judgement satisfies a predetermined condition that is a condition in which a ratio of the at least one element that has been displayed at the position at which browsing is available for the user to the at least one element exceeds a threshold, the information indicating that the content has actually been browsed by the user.

2. The arrangement program according to claim 1, wherein the acquiring includes acquiring, as the browsing mode information, information that indicates a shape of the content.

3. The arrangement program according to claim 2, wherein the acquiring includes acquiring, as the information that indicates the shape of the content, a size of the content.

4. The arrangement program according to claim 1, wherein the transmitting includes transmitting, as the display state information, information indicating that the at least one element has been displayed at the position at which browsing is available for the user.

5. The arrangement program according to claim 1, wherein
the arranging includes arranging another element that is used to control a timing of the judgement obtained at the judging in an invisible area that is located outside the content area, and
the judging includes judging, when the other element arranged at the arranging is displayed at the position at which browsing is available for the user, whether the at least one element has been displayed at the position at which browsing is available for the user.

6. The arrangement program according to claim 1, wherein the acquiring includes acquiring, as the browsing mode information, information indicating an operating characteristic with respect to the content.

7. An arrangement device comprising:
an acquiring unit that acquires browsing mode information that indicates a mode of browsing content;
an arranging unit that arranges, in the mode based on the browsing mode information acquired by the acquiring unit, at least one element including a plurality of elements, that is used to judge whether the content has actually been browsed by a user in a content area in which the content is provided, wherein the arranging includes:
dividing, based on the browsing mode information, the content area into a plurality of areas and arranging each of the plurality of elements in a center of each of the plurality of areas for detection of viewable state, wherein the dividing involves dividing the content area into the plurality of areas based on a ratio of width to height of the content area;
if a number of the plurality of areas in a vertical direction is an even number, one of the at least one element is arranged in a center of the content area; and
if the number of the plurality of areas in the vertical direction is an odd number, the at least one element is not arranged in the center of the content area, wherein a middle area of the plurality of areas in the vertical direction serves as an element for judging;
judging whether the at least one element arranged at the arranging has been displayed at a position at which browsing is available for the user; and
transmitting, based on the judgement obtained at the judging, display state information related to a display state of the content, wherein the transmitting includes transmitting, when the judgement satisfies a predetermined condition that is a condition in which a ratio of the at least one element that has been displayed at the position at which browsing is available for the user to the at least one element exceeds a threshold, the information indicating that the content has actually been browsed by the user.

8. An arrangement method performed by a computer, the arrangement method comprising:
acquiring browsing mode information that indicates a mode of browsing content;
arranging, in the mode based on the browsing mode information acquired at the acquiring, at least one element including a plurality of elements, that is used to judge whether the content has actually been browsed by a user in a content area in which the content is provided, wherein the arranging includes:
dividing, based on the browsing mode information, the content area into a plurality of areas and arranging each of the plurality of elements in a center of each of the plurality of areas for detection of viewable state, wherein the dividing involves dividing the content area into the plurality of areas based on a ratio of width to height of the content area;
if a number of the plurality of areas in a vertical direction is an even number, one of the at least one element is arranged in a center of the content area; and
if the number of the plurality of areas in the vertical direction is an odd number, the at least one element is not arranged in the center of the content area, wherein a middle area of the plurality of areas in the vertical direction serves as an element for judging;
judging whether the at least one element arranged at the arranging has been displayed at a position at which browsing is available for the user; and
transmitting, based on the judgement obtained at the judging, display state information related to a display state of the content, wherein the transmitting includes transmitting, when the judgement satisfies a predetermined condition that is a condition in which a ratio of the at least one element that has been displayed at the position at which browsing is available for the user to the at least one element exceeds a threshold, the information indicating that the content has actually been browsed by the user.

* * * * *